United States Patent
Bhatia et al.

(10) Patent No.: US 12,519,805 B2
(45) Date of Patent: Jan. 6, 2026

(54) BIAS MITIGATION IN THREAT DISPOSITION SYSTEMS

(71) Applicant: INTERNATIONAL BUSINESS MACHINES CORPORATION, Armonk, NY (US)

(72) Inventors: Aankur Bhatia, Bethpage, NY (US); Gary I. Givental, Bloomfield Hills, MI (US); Namrata Tolani, Bangalore (IN); Ajmeera Balaji Naik, Reddigudem Mandal (IN); Oleksandr Shmaliy, Wroclaw (PL)

(73) Assignee: International Business Machines Corporation, Armonk, NY (US)

( * ) Notice: Subject to any disclaimer, the term of this patent is extended or adjusted under 35 U.S.C. 154(b) by 997 days.

(21) Appl. No.: 17/568,590

(22) Filed: Jan. 4, 2022

(65) Prior Publication Data

US 2023/0216865 A1 Jul. 6, 2023

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01)

(58) Field of Classification Search
None
See application file for complete search history.

(56) References Cited

U.S. PATENT DOCUMENTS

| 7,949,662 | B2 | 5/2011 | Farber et al. | |
| 2007/0094725 | A1* | 4/2007 | Borders | H04L 63/1408 726/13 |
| 2013/0046558 | A1 | 2/2013 | Landi et al. | |
| 2015/0163242 | A1* | 6/2015 | Laidlaw | H04L 63/1425 726/22 |
| 2016/0357790 | A1 | 12/2016 | Elkington et al. | |
| 2016/0359759 | A1 | 12/2016 | Singh et al. | |
| 2020/0168231 | A1 | 5/2020 | Alagianambi | |
| 2020/0380309 | A1 | 12/2020 | Weider et al. | |

(Continued)

OTHER PUBLICATIONS

Bontcheva, K. et al., "Balancing Act: Countering Digital Disinformation While Respecting Freedom of Expression," geneva, Switzerland: United Nations Educational, Scientific and Cultural Organization, Sep. 2020, 348 Pg.

(Continued)

*Primary Examiner* — Atta Khan
(74) *Attorney, Agent, or Firm* — Harrity & Harrity, LLP

(57) ABSTRACT

Mitigating bias in a machine learning-augmented threat disposition platform can include generating a group of alerts in response to determining a similarity among the alerts. The alerts are generated in real time by a threat monitoring tool in response to one or more potential threats to a networked computing system. One or more alert spikes can be determined by partitioning the group into one or more alert spike subgroups. Each alert spike subgroup corresponds to an alert spike and contains two or more similar alerts that were generated within a predetermined time interval of one another. Duplicate alerts in each alert spike can be eliminated and each non-discarded alert labeled. The labeled alerts are used for training a reduced-bias machine learning model.

20 Claims, 11 Drawing Sheets

(56) References Cited

U.S. PATENT DOCUMENTS

| | | | | |
|---|---|---|---|---|
| 2023/0224311 A1* | 7/2023 | Meshi | ................. | H04L 41/0609 |
| | | | | 726/22 |
| 2023/0283629 A1* | 9/2023 | Boyer | ................. | H04L 63/1416 |
| | | | | 726/22 |
| 2025/0039210 A1* | 1/2025 | Rahmes | .............. | H04L 63/1416 |

OTHER PUBLICATIONS

Dahir, H. et al., "Dynamic Trust and Risk Scoring Using Last-Known Profile Learning," [online] IP.com Prior Art Database Technical Disclosure, No. IPCOM000247388D, Copyright 2016 Cisco Systems, Inc., Aug. 31, 2016, retrieved from the Internet: <https://priorart.ip.com/IPCOM/000247388>, 13 pg.

Somaraju, A., "Protection Against Adversarial Attacks on Machine Learning and Artificial Intelligence," [online] IP.com Prior Art Database Technical Disclosure, No. IPCOM000252595D, Copyright 2018 Cisco Systems, Inc., Jan. 29, 2018, retrieved from the Internet: <https://priorart.ip.com/IPCOM/000252595>, 8 pg.

"System and Method to Counter Adversaries via Data and Model Biasing," [online] IP.com Prior Art Database Technical Disclosure, No. IPCOM000259028D, Jul. 4, 2019, retrieved from the Internet: <https://priorart.ip.com/IPCOM/000259028>, 5 pg.

La Diega, G.N., "Against the Dehumanisation of Decision-Making," J. Intell. Prop. Info. Tech. & Elec. Com. L., 2018, 9, p. 3.

Mell, P. et al., The NIST Definition of Cloud Computing, National Institute of Standards and Technology, U.S. Dept. of Commerce, Special Publication 800-145, Sep. 2011, 7 pg.

* cited by examiner

Generate a group of alerts in response to determining a similarity among the alerts, the alerts generated in real time by a threat monitoring tool in response to one or more potential threats to a networked computing system
202

Determine one or more alert spikes by partitioning the group into subgroups, wherein each alert spike comprises a subgroup of two or more similar alerts that were generated within a predetermined time interval of one another
204

Discard duplicate alerts in each spike group
206

Label each non-discarded alert for training a reduced-bias machine learning model
208

Add a newly generated alert to the existing alert spike subgroup in response to determining, in real time, a similarity between the newly generated alert and a previously generated alert contained in the existing alert spike subgroup, the newly generated alert and one or more alerts contained in the existing alert spike subgroup generated within a predetermined time interval
210

Responsive to determining, in real time, a similarity between a first newly generated alert and a second newly generated alert generated within a predetermined time interval of generation of the first newly created alert, create an incipient alert spike subgroup containing the first and second newly generated alerts
212

Close one of the one or more alert spike subgroups in response to determining that a predetermined time interval has lapsed without adding a newly generated alert to the one of the one or more alert spike subgroups, wherein the closing removes the one of the one or more alert spikes from a list of active alert spike subgroups and discards the alerts contained therein
214

FIG. 2

| remedy_customer_id | xps_alert_create | siem_rule_name | event_namaes | sip_int | dip_int | sip_ext | dip_ext | mitre_tactic | src_geo | dst_geo | ai_alert_soc_status |
|---|---|---|---|---|---|---|---|---|---|---|---|
| PR00008306 | 2021-02-08 20:20:37 | Q1_UBA_Alert_AN | UBA Offense - User crossed risk threshold | 0 | 0 | 1 | 1 | Informational | unknown | unknown | 1 |
| PR00008306 | 2021-02-08 20:20:37 | Q1_UBA_Alert_AN | UBA Offense - User crossed risk threshold | 0 | 0 | 1 | 1 | Informational | unknown | unknown | 1 |
| PR00008306 | 2021-02-08 20:20:37 | Q1_UBA_Alert_AN | UBA Offense - User crossed risk threshold | 0 | 0 | 1 | 1 | Informational | unknown | unknown | 1 |
| PR00008306 | 2021-02-08 20:26:39 | Q1_UBA_Alert_AN | UBA Offense - User crossed risk threshold | 0 | 0 | 1 | 1 | Informational | unknown | unknown | 1 |
| PR00008306 | 2021-02-08 20:31:16 | Q1_UBA_Alert_AN | UBA Offense - User crossed risk threshold | 0 | 0 | 1 | 1 | Informational | unknown | unknown | 1 |

BIAS MITIGATION IN THREAT DISPOSITION SYSTEMS

BACKGROUND

This disclosure relates generally to the protection of computer systems and networks against cyberattacks, and more specifically, to machine learning-based threat disposition.

Among the computer security tools available for protecting computer systems and networks against cyberattacks is a security information and event management (STEM) system. A SIEM system can aggregate and analyze machine data from various sources, detecting events that deviate from predefined behavioral rules. Such deviations, detected in real time by the STEM system, can indicate a potential threat to a computer system or network. In response, the SIEM system generates an alert that enables an appropriate action to counter the threat. Often, it is a threat analyst, possibly working in conjunction with a threat disposition system, that determines how a STEM-generated threat is handled.

SUMMARY

In one or more embodiments, a method for mitigating bias in a machine learning-augmented threat disposition platform can include generating a group of alerts in response to determining a similarity among the alerts, the alerts generated in real time by a threat monitoring tool in response to one or more potential threats to a networked computing system. The method can include determining one or more alert spikes by partitioning the group into one or more alert spike subgroups, each alert spike subgroup corresponding to an alert spike and containing two or more similar alerts that were generated within a predetermined time interval of one another. The method can include discarding duplicate alerts in each alert spike and labeling each non-discarded alert for training a machine learning model.

In one or more embodiments, a system for mitigating bias in a machine learning-augmented threat disposition platform includes one or more processors configured to initiate operations. The operations can include generating a group of alerts in response to determining a similarity among the alerts, the alerts generated in real time by a threat monitoring tool in response to one or more potential threats to a networked computing system. The operations can include determining one or more alert spikes by partitioning the group into one or more alert spike subgroups, each alert spike subgroup corresponding to an alert spike and containing two or more similar alerts that were generated within a predetermined time interval of one another. The operations can include discarding duplicate alerts in each alert spike and labeling each non-discarded alert for training a machine learning model.

In one or more embodiments, a computer program product includes one or more computer readable storage media having instructions stored thereon. The instructions are executable by a processor to initiate operations. The operations can include generating a group of alerts in response to determining a similarity among the alerts, the alerts generated in real time by a threat monitoring tool in response to one or more potential threats to a networked computing system. The operations can include determining one or more alert spikes by partitioning the group into one or more alert spike subgroups, each alert spike subgroup corresponding to an alert spike and containing two or more similar alerts that were generated within a predetermined time interval of one another. The operations can include discarding duplicate alerts in each alert spike and labeling each non-discarded alert for training a machine learning model.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 2 illustrates an example method performed by the system of FIG. 1 for detecting alert spikes and eliminating duplicate alerts.

FIG. 3 illustrates example data structures of alerts received by the system of FIG. 1.

DETAILED DESCRIPTION

Figure 1:
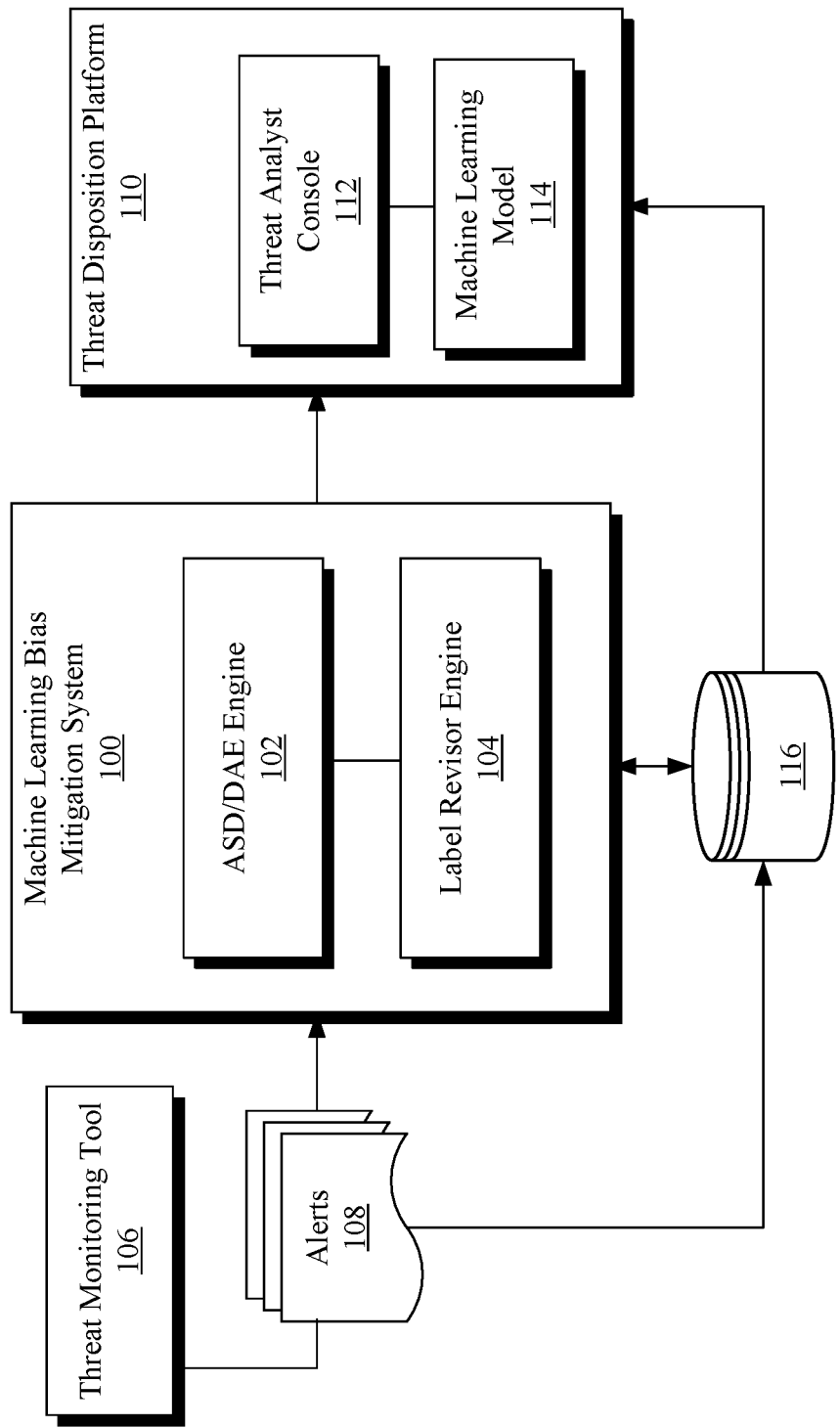
FIG. 1 illustrates an example of mitigating bias in a machine learning-augmented threat disposition platform.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates generally to the protection of computer systems and networks against cyberattacks, and more specifically, to machine learning-based threat disposition. As already noted, a tool for protecting computer systems and networks is a SIEM system that, in real time, can detect behavior that deviates from a predefined behavioral rule and respond by generating an alert indicating a potential threat. Though the SIEM system generates an alert automatically, it typically falls to a human analyst to decide whether the threat is real and what the optimal disposition is. The analyst may decide the alert merely duplicates an earlier alert or is false positive and recommend closing the alert with no further action. If, however, the analyst decides the alert is real—either a first of its kind or one previously encountered—the analyst may escalate the alert for further action.

While there are threat disposition platforms able to classify an alert generated by a SIEM system, such systems typically rely on static algorithms that simply calculate a score according to predefined attributes incorporated in an alert rule. One mechanism to increase the accuracy of a threat disposition platform and decrease its dependence on human analysts is to augment the threat disposition platform with machine learning. Using supervised learning, a machine learning model can be trained to generate a data-driven response to an STEM-generated alert. The machine learning model can be trained by using prior dispositions of alerts as labeled training examples. Moreover, the machine learning model can continue learning over time as new alerts are classified and, as necessary, prior alert classifications are revised upon discovery of an analyst's misclassification or in view of newly acquired information.

Notwithstanding the advantages of a threat disposition platform augmented with machine learning, the platform's efficacy can be diminished considerably if the machine learning model implemented by the platform is biased. Bias stems from factors that adversely affect the labeling of alerts used to train the machine learning model. Bias not only arises from incorrect labeling of alerts, but also from inconsistent labeling of the same or similar alerts.

The problem of bias can be exacerbated by the fact that it is not uncommon for a STEM system feeding, in real time, to the threat disposition platform a large volume of duplicate alerts in a brief time interval. The number can increase from a few to several thousand alerts in a mere matter of minutes, resulting in an alert spike. An incorrect disposition of the alerts—especially given the sheer number of alerts in a spike—can bias the machine learning model that learns to classify future events according to the incorrect disposition. Moreover, processing the large number of alerts engendered by an alert spike can require considerable time and effort if processing must be performed manually.

Bias can also result from a bulk action taken in response to an alert spike. A bulk action can lead an analyst who faces a large-volume alert spike to escalate an initial alert and then, to avoid having to process the non-discarded alerts, close the rest. Again, the result is an inconsistent disposition of similar alerts, which introduces bias in machine learning data that comprises prior alert dispositions handled differently for the same or similar alerts.

The systems, methods, and computer program products disclosed herein are capable of mitigating or entirely eliminating bias in a machine learning-augmented threat disposition system. An aspect of the systems, methods, and computer program products disclosed herein is the real-time detection and filtration of alert spikes. Another aspect is the automated revision of alerts that are either mischaracterized or inconsistently characterized.

In certain embodiments, the systems, methods, and computer program products detect similarities among alerts based on a predefined set of parameters and group the alerts according to the detected similarities. Groups of similar alerts are partitioned into subgroups comprising alerts generated during a brief time span, each detected subgroup comprising an actual or incipient spike. Through subsequent filtration, duplicate alerts are eliminated, which can mitigate bias stemming from alerts that are duplicative of one another but that may be inconsistently labeled owing to an analyst's bulk action, as described above. The machine learning model of a machine learning-augmented threat disposition system continues to learn from newly generated alerts that are labeled and input into the model as new or additional training examples. Eliminating duplicate alerts can mitigate bias that may arise from inconsistently labeling alerts through an analyst's bulk action. The mitigation of bias enhances the predictive accuracy of the machine learning model.

Moreover, by eliminating duplicate alerts, the systems, methods, and computer program products enhance the efficiency of the machine learning model without diminishing accuracy. Duplicate alerts do not provide additional information but do consume computer hardware resources that are devoted to machine learning. Processor use is required to process the duplicate alerts, and memory allocation is required to store the duplicate alerts. Thus, eliminating duplicate alerts frees up the hardware resources used by the machine learning model without depriving the machine learning model of information that enhances the model's accuracy.

The systems, methods, and computer program products disclosed herein, in certain embodiments, further enhance the predictive accuracy the machine learning model of a machine learning-augmented threat disposition system by revising labels assigned to the alerts. The labels indicate the handling (e.g., escalation or closure) of the alerts. A label can be revised in response to determining a likelihood that the label—or, more specifically, the prior assessment of the corresponding alert—is incorrect. Time-based weights are assigned to alerts that, again, are determined to be similar to one another. The weights, in some embodiments, are determined as a declining function of time (e.g., an exponentially decaying time function) so as to give greater effect to more recently handled alerts. A ground truth corresponding to the correct labeling of the similar alerts is determined based on the assigned weights. Those alerts whose labels are inconsistent with the ground truth are revised to comport with the established ground truth. Updating or retraining the machine learning model using relabeled alerts as training examples further enhances the model's predictive accuracy and thereby improves the overall performance of a machine learning-augmented threat disposition system.

The spike detections, duplicate alert eliminations, and label corrections brought about with the systems, methods, and computer program products disclosed herein can thus significantly increase the predictive accuracy of a model used by a threshold disposition system augmented by machine learning. Indeed, in certain applications, the improvement is as much as eight percent, with the accuracy of the machine learning model used improving from 89 percent to 97 percent. Moreover, the systems, methods, and computer program products disclosed herein can improve the recall rate for the systems and reduce the number of false negatives generated by the systems. The systems, methods, and computer program products, in addition to improving the accuracy of the machine learning model, can alleviate a considerable amount of the alert processing and memory storage required with conventional systems. Thus, the systems, methods, and computer program products disclosed herein also improve a machine learning-augmented threat disposition system in terms of computer hardware efficiency.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 6:
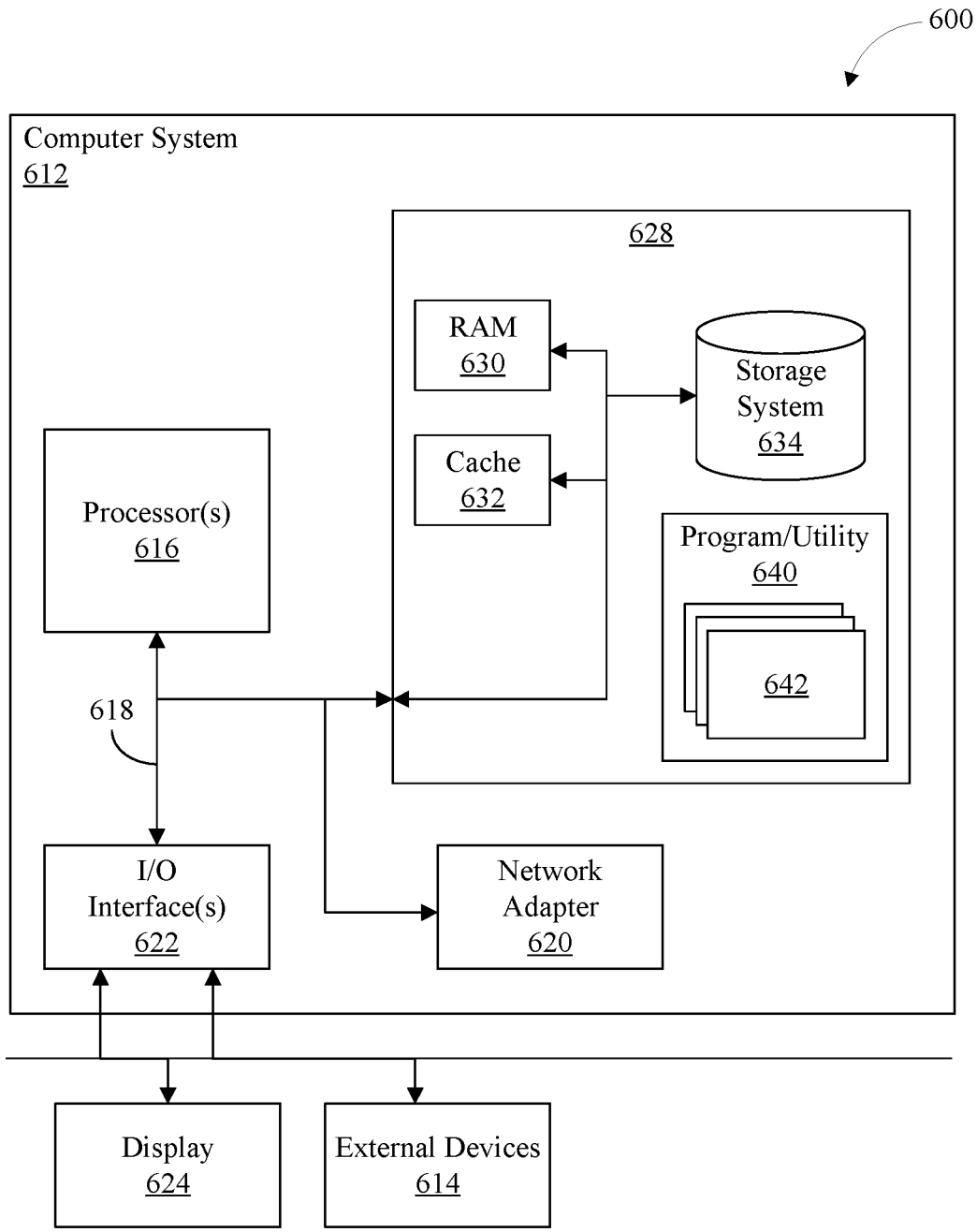
FIG. 6 illustrates a computing node for implementing the system of FIG. 1.

Referring initially to FIG. 1, an example system for mitigating bias in a machine learning-augmented threat disposition platform (system) 100 is illustrated. System 100 illustratively includes alert spike detector and duplicative alert eliminator (ASD/DAE) engine 102 and label revisor engine 104. In various embodiments, ASD/DAE engine 102 and label revisor engine 104 of system 100 can be implemented in hardware (e.g., dedicated hardwired circuitry), software (e.g., program code executed by one or more processors), or a combination thereof. For example, system 100 in certain embodiments is implemented in a computing node, such as computing node 600 (e.g., cloud-based server), in which system 100 comprises program code that is electronically stored in a memory, such as memory 628, and executes on one or more processors, such as processor 616 of computer system 612 (FIG. 6).

Illustratively, system 100 operatively couples with threat monitoring tool 106. System 100 can operatively couple with threat monitoring tool 106 via a wired or wireless connection with threat monitoring tool 106. Threat monitoring tool 106 is configured to communicatively couple with and counter cyberattack threats against one or more networked computers (not shown). The one or more networked computers can communicatively couple to the Internet and/or or other computer network(s), such as an enterprise network, wide-area network (WAN), local-area network (LAN), or other data communication network for exchanging data with various external computer systems. Threat monitoring tool 106, in real time, generates alerts 108 in response to potential cyberattack threats against the one or more networked computers. Threat monitoring tool 106 can comprise a STEM tool—combining security information management (SIM) and security event management (SEM)—which provides real-time analysis of security alerts generated by application software and network hardware.

The disposition of an alert generated by threat monitoring tool 106 can be determined by threat disposition platform 110. Threat disposition platform 110, for example, can identify the alert as a true positive, a false positive, or a duplicate. In view of the determination, threat disposition platform 110 can recommend an action. The recommended action can be escalation in response to determining the alert is a true positive and warrants further investigation (e.g., by an analyst at analyst console 112) or closure (e.g., no further action) in response to determining the alert is a false positive. Threat disposition platform 110 illustratively includes machine learning model 114. Through supervised learning using labeled examples (e.g., previous dispositions of alerts electronically stored in database 116), machine learning model 114 is trained to automatically classify alerts 108. The role of system 100 is to mitigate bias that reduces the predictive performance and confidence of machine learning model 114.

One source of bias is the misclassification of alert spikes. An alert spike occurs whenever a high volume of alerts is generated in a brief span of time. With a spike, the volume of alerts generated by threat monitoring tool 106 can increase from a few (an incipient spike) to several thousand in minutes. An alert spike may occur due to a specific configuration or alert-generation rule causing threat monitoring tool 106 to generate a plurality of alerts in which all or most of the alerts are duplicative. Misclassification of the spike—classifying true alerts as false positives or false alerts as true positives—can bias classifications made by machine learning model 114, which as a result of the misclassification learns to misclassify future alerts. Moreover, if the alerts are manually processed by an analyst using threat analyst console 112, the volume of the alert spike means that the analyst is unnecessarily processing duplicate alerts that do not increase the information available for determining a disposition of the alerts in the future.

Referring additionally to FIG. 2, example method 200 of determining alert spikes and eliminating duplicate alerts is illustrated. Method 200 can be performed by ASD/DAE engine 102 of system 100. At block 202, ASD/DAE engine 102 can generate one or more groups of alerts in response to determining a similarity among alerts that are generated in real time by threat monitoring tool 106 in response to one or more potential cyberthreats. ASD/DAE engine 102 can determine, in real time, a similarity of two or more alerts. Similarity can be determined by ASD/DAE engine 102 in real time based on a comparison of data structures created for and corresponding to each of the alerts generated by threat monitoring tool 106.

Example data structures for five example alerts is illustrated by matrix 300 of FIG. 3, in which each row corresponds to a 12-element feature vector representation of an alert. Each element of the feature vectors corresponds to a pre-selected parameter, including the time the alert is generated (second element) and the rule according to which the alert is generated (third element). Similarity among the alerts is determined by ASD/DAE engine 102 is determined based on comparing pairs of feature vectors and determining an equality with respect to one or more parameters of each of the pairs. Two alerts are duplicative if a predetermined subset of features of the alerts' feature vectors match.

For example, with respect to the five example alerts of matrix 300, the predetermined subset of features are illustratively remedy_customer_id, siem_rule_name, event_names,_sip_int, dip_int, sip_ext, dip_ext, mitre_tactic, log_sources, src_geo, dst_geo, and ai_alert_soc_status. Remedy_customer_id is a unique identifier of the entity whose system is monitored. Xps_alert_create is the creation date and time of the alert. Siem_rule_name is the predefined internal rule for alert generation. Event_names is a predefined external rule_name. Sip_int is an internal source ip count indicating that the threat was initiated from one or more internal ips, where "ip" refers to Internet Protocol (IP) address (e.g., ip count refers to the number of addresses). All ip counts (4 features) can be zero if no ip is found for the specific section in the alert data. Dip_int is an internal destination ip count. Sip_ext is an external source ip count. Dip_ext is an external destination ip count. Mitre_tactic is a predefined alert classification (e.g., according to MITRE ATT&CK® Framework). Src_geo is a geographic indication of the threat's source. Dst_geo is a geographic indication of the threat's destination. Ai_alert_soc_status is a target label indicating a status of the alert. Illustratively, "0" indicates the alert is closed, and "1" is a directive to escalate monitoring and/or analysis of the alert. Based on the comparison of feature vectors of matrix 300, ASD/DAE engine 102 determines the values of each the predetermined features of the feature vectors match and thus the corresponding five alerts are duplicative.

Figure 4:
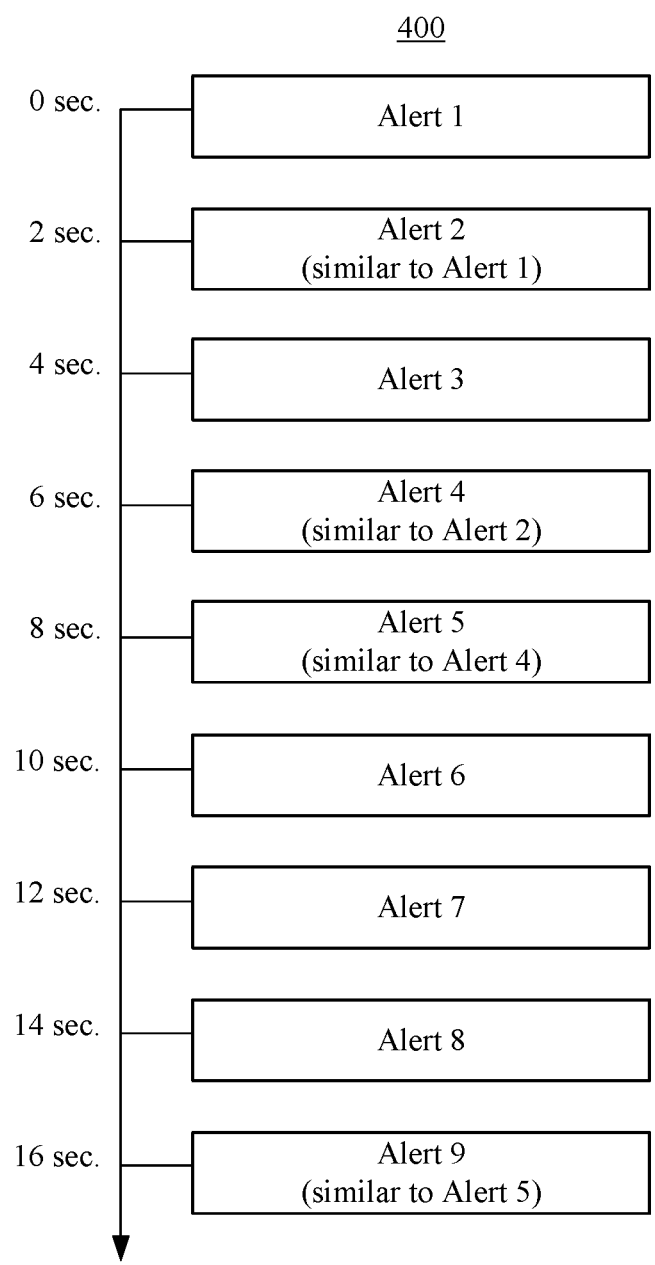
FIG. 4 illustrates the formation of an alert spike subgroup by the system of FIG. 1 using a predetermined time interval.
Figure 5A:
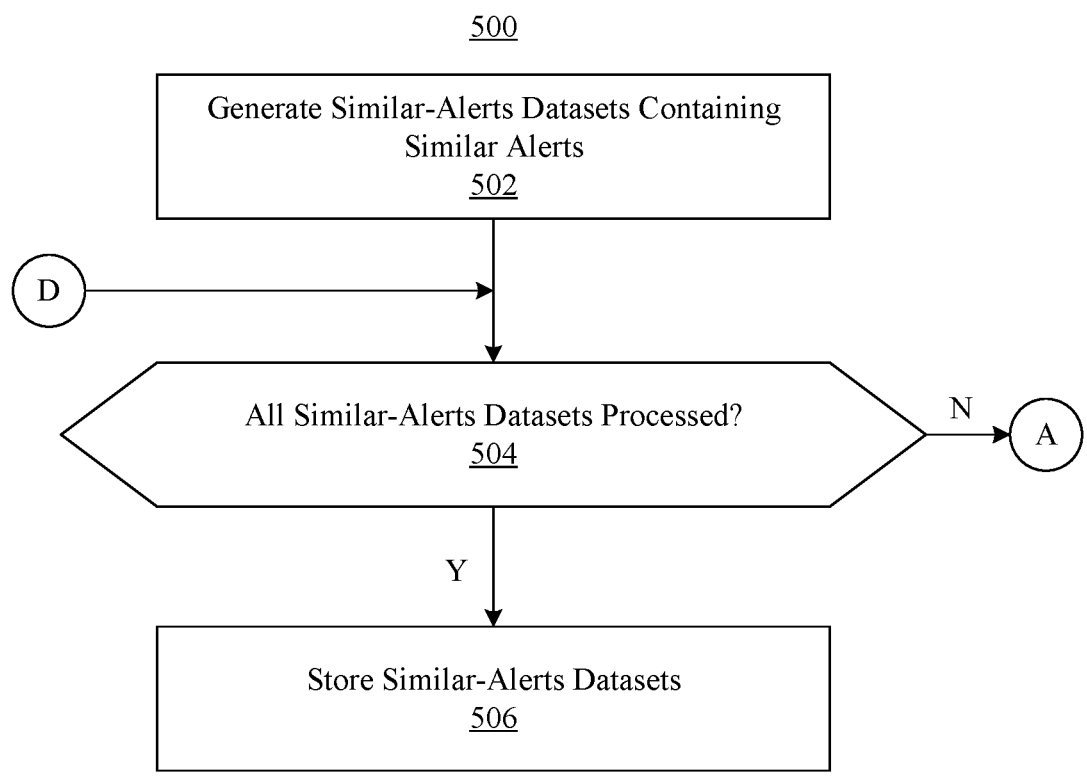
FIGS. 5A-5D illustrate an example method performed by the system of FIG. 1 for revising labels of misclassified or inconsistently classified alerts.
Figure 5B:
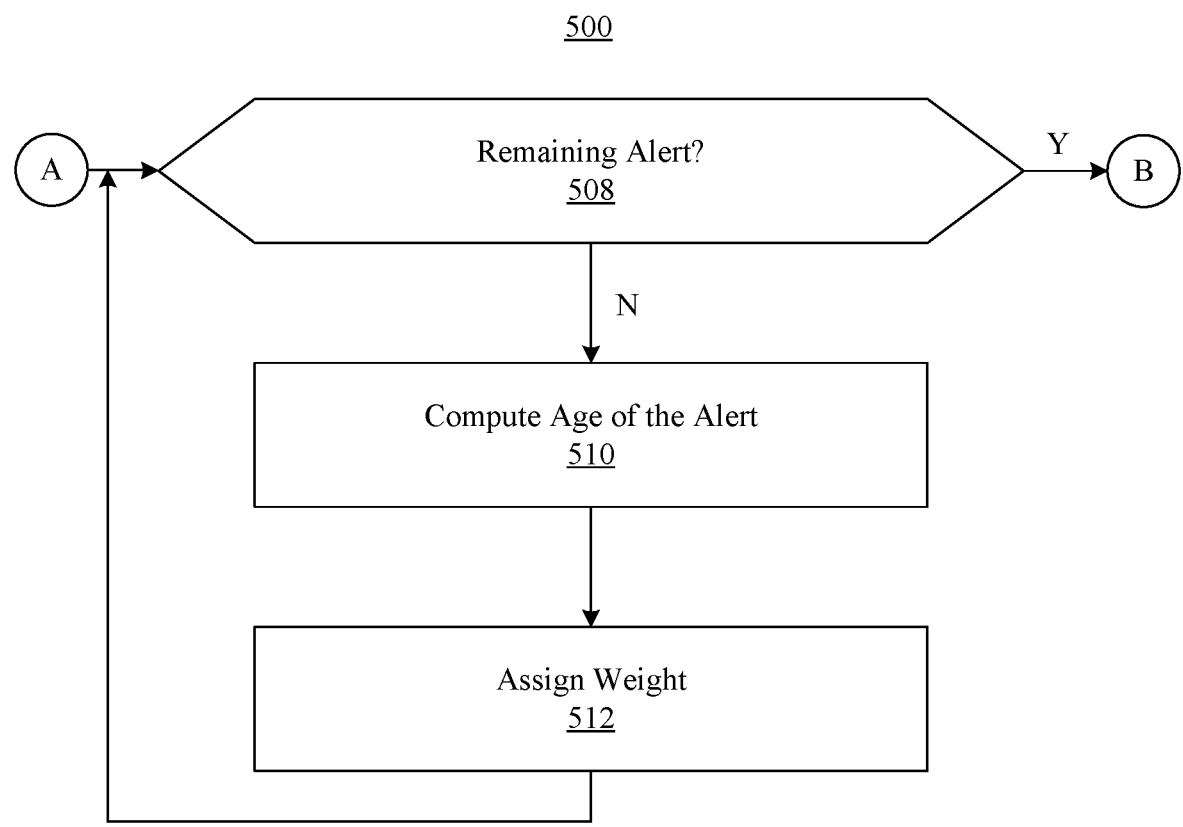
Figure 5C:
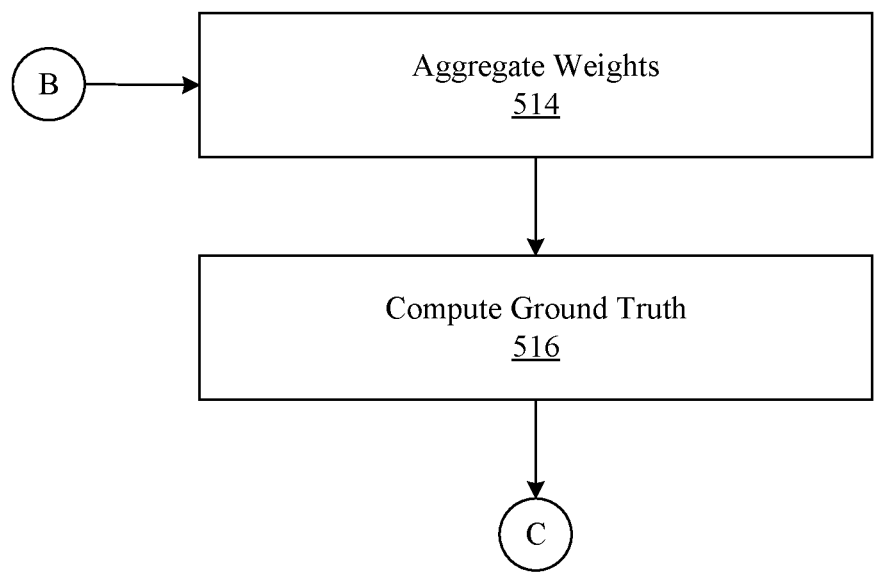
Figure 5D:
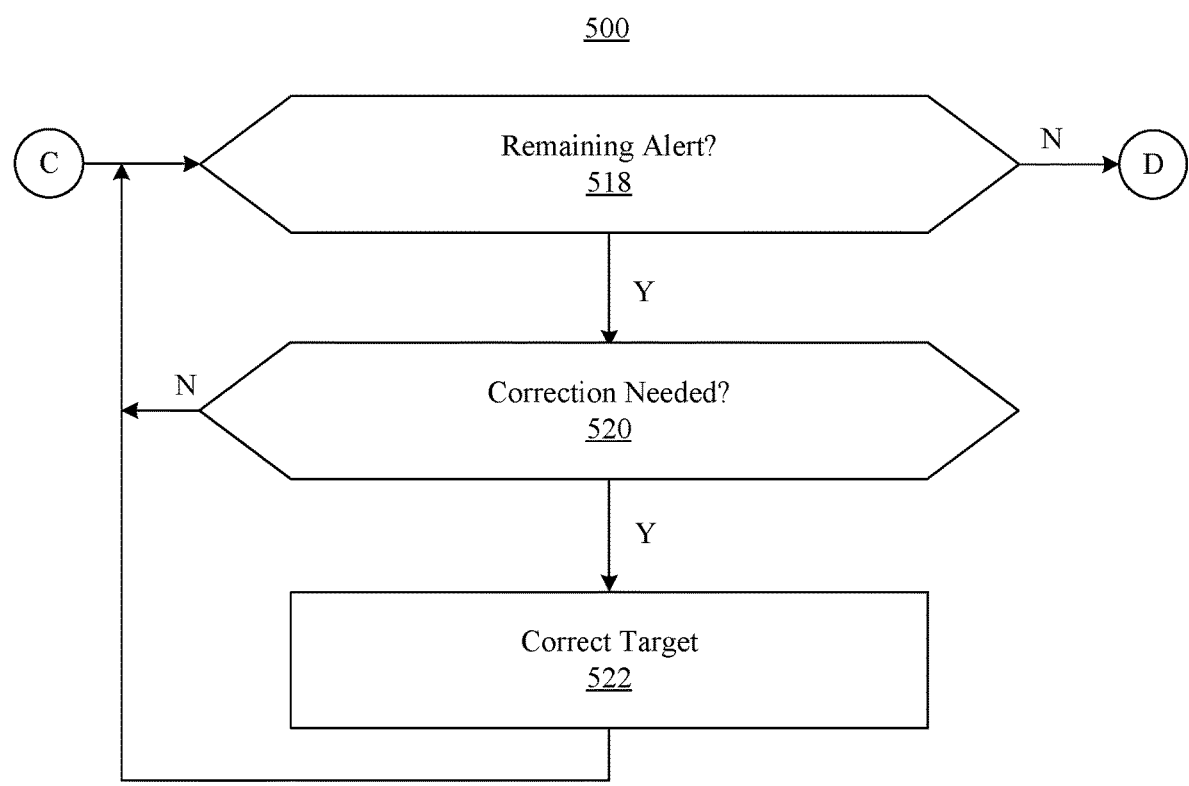

At block 204, ASD/DAE engine 102 can determine one or more alert spikes by partitioning each group generated at block 202 into one or more subgroups, each defining an alert spike subgroup. ASD/DAE engine 102 can partition each group based on times that each of the alerts was generated. Each alert spike subgroup thus comprises similar alerts that were generated within a predetermined time interval of one another. Two or more alerts, though similar, are only joined in an alert spike subgroup if each of the alerts were generated with the predetermined time interval. FIG. 4 illustrates the formation of an alert subgroup using a predetermined time interval of five seconds. Illustratively, nine alerts 400 are generated in succession, each generated two seconds apart. Initially, alert 1 is generated, and two seconds later, alert 2 is generated. Because alert 2 is similar to alert 1 and is generated within the predetermined time interval, both are joined in an alert spike subgroup. Alert 3 generated two seconds later is not similar to either prior alert, and thus is not joined to the alert spike subgroup. Alert 4, which is similar to alert 2 and is generated four seconds after alert 2 (within the five-second time interval), is joined to the alert spike subgroup. Alert 5, generated two seconds after alert 4, is similar to alert 4 and is therefore joined to the alert spike subgroup. Alerts 6, 7, and 8 are each dissimilar from alerts 1, 2, 4, and 5, and thus are not joined to the alert spike subgroup. Alert 9 is similar to alert 5 but is generated after expiration of the predetermined five-second time interval as measured from alert 5 (the alert most recently joined to the alert spike subgroup), and therefore is not joined to the alert spike subgroup.

At block 206, ASD/DAE engine 102 can discard duplicate alerts in each spike group. ASD/DAE 102 identifies duplicate alerts by comparing the alerts' data structures and identifying those that are identical to one another. One alert from each subgroup is retained and each identical, duplicate alert is discarded. Accordingly, for n identical data structures, ASD/DAE engine 102 retains one and eliminates the remaining n–1 identical data structures.

At block 208, ASD/DAE engine 102 can label each non-discarded alert. ASD/DAE engine 102 labels each of the non-discarded alerts now labeled and electronically stores a now-labeled corresponding data structure in database 116. The alerts are now available for updating machine learning model 114, which based on the detection and filtration of the alerts comprises a reduced-bias machine learning model. With respect to the training cycle machine learning model 114, grouping and partitioning happens over an entire set alert training data, with the process repeating periodically (e.g., weekly using updated alert data).

Grouping similar alerts and partitioning each group into alert spike subgroups is an ongoing process that can be performed continuously in real time by system 100, which can constantly monitor incoming alerts and create new subgroups as needed. At any moment of time, the list of subgroups may be empty if there are no alerts. This can occur initially when only a single alert is observed. It may occur later, when all observed subgroups are cleaned by discarding duplicates and closing each subgroup. Indeed, much of the time the list of subgroups will be empty given the extremely high probability that spikes are not happening constantly.

ASD/DAE engine 102 is capable of determining whether a newly generated alert spike is part of an existing alert spike subgroup. At block 210, ASD/DAE engine 102 can add a newly generated alert to an existing alert spike subgroup in response to determining, in real time, a similarity between a newly generated alert and a previously generated alert contained in the existing alert spike subgroup. As a condition of adding the newly generated alert, ASD/DAE engine 102 determines whether the newly generated alert and one or more alerts contained in the existing alert spike subgroup were generated within a predetermined time interval.

A newly generated alert may be dissimilar from every previously generated spike contained in the existing alert spike subgroup(s). A newly generated alert may be similar to one or more previously generated alerts in an existing alert spike subgroup but may not have been generated within a predetermined time interval of any similar alert previously generated. If ASD/DAE engine 102 determines that either condition holds with respect to a newly generated alert, then ASD/DAE engine 102 avoids joining the newly generated alert to an existing alert spike subgroup. Nevertheless, if the alert remains active (e.g., not disposed of by a closure), ASD/DAE engine 102 can monitor the newly generated alert for a predetermined time interval to determine whether another alert, similar to the newly generated alert, is subsequently generated within the predetermined time interval.

At block 212, responsive to determining, in real time, a similarity between a first newly generated alert and a second newly generated alert, generated within the predetermined time interval after generation of the first, ASD/DAE engine 102 creates an incipient alert spike subgroup that contains the first and second newly generated alerts. If similar alerts are also generated within the predetermined time interval, these similar alerts are also joined to the incipient alert spike subgroup. If a sufficient number of similar alerts are joined to the alert spike subgroup, ASD/DAE engine 102 re-designates the incipient alert spike subgroup, removing the "incipient" qualifier. ASD/DAE engine 102 can compile a list of active alert spike subgroups, adding to the list an identifier identifying each newly created alert spike subgroup. Periodically, given that new alert spike subgroups can be added over time, ASD/DAE engine 102 can repeat the filtration procedure to identify and discard duplicate alerts from each alert spike subgroup.

At block 214, ASD/DAE engine 102 closes an alert spike subgroup in response to determining than no new alert that meets the conditions for being joined to the alert spike group has been generated within a predetermined time interval. ASD/DAE engine 102, by closing an alert spike subgroup, discards all but one of the alerts contained therein and removes the identifier corresponding to the alert spike subgroup from the list of active alert spike subgroups.

The predictive performance and confidence of machine learning model 114 depends on the labeled alerts (previously disposed alerts) that serve as examples for training machine learning model 114 using supervised learning. As already noted, it is not only alerts that are mislabeled as a result of misclassification, but it also is inconsistent labeling of similar alerts that can bias machine learning model 114. Alerts can be inconsistently labeled, for example, if similar alerts are handled inconsistently (e.g., escalating some, closing others) by different analysts or the same analyst at different times.

Referring additionally now to FIGS. 5A-5D, example method 500 for revising labels of misclassified or inconsistently classified alerts is illustrated. Method 500 can be performed by label revisor engine 104 of system 100. Initially, at block 502, ASD/DAE 102 identifies similar events electronically stored in database 116 and generates one or more similar-alerts datasets, each such dataset containing alerts identified as similar to one another. Similar alerts can be determined by comparing the alerts' data structures. For example, as described above, the data structure of each alert can be a feature vector. If the values of one or more preselected features (e.g., columns of the feature vectors in matrix 300 (FIG. 3)) of two or more alerts' respective feature vectors match, then the alerts are deemed similar.

In certain embodiments, a unique 128-bit hash signature can be generated for each preselected feature (e.g., column of the alerts' feature vectors). For any two alerts, if the hashes match or their cosine similarity is one (based on 128-bit vectors), then the two alerts are similar to one another with respect to that feature. Determining similarity in this manner offers distinct advantage. One advantage is that computations can be performed significantly faster than with other vectorization algorithms and techniques. Another advantage is elimination of any need to re-compute hash-based vectors for older data. With other techniques, each newly generated alert cannot be simply vectorized and similarity computed before the alert can be added to a set of data used in training or updating machine learning model 114. Rather, it is necessary to vectorize the entire dataset to ensure the consistency of the vector space since vector similarities are defined over a single vector space. This means that every time training happens, the runtime overhead due to re-computation of vectors for the entire dataset is directly added to the training time. Using the technique disclosed herein, however, requires only the computation of the unique hashes (128-bit binary vectors) for the new data, which can then be used with older similar-alerts datasets already generated based on similarity. This provides for faster training time. Another advantage relates to time of identifying similarity. Typically, identifying similar items from a group of n items takes, O(n*n) time. With the technique disclosed herein, however, it takes O(n) time, where n is the number of alerts in the training dataset. The faster runtime is very apparent as the size of the training dataset is typically in the order of millions.

Label revisor engine 104, at block 504 determines whether all similar-alerts datasets have been processed to revise labels assigned to the events as needed, and if so, electronically stores the similar-alerts dataset(s) at block 506. Otherwise, label revisor engine 104 proceeds to process a remaining similar-alerts dataset.

A correct label for each alert in a similar-alerts dataset depends on a ground truth, which by assumption accords with the most recent dispositions of the similar alerts. Accordingly, for each similar-alerts data set, label revisor engine 104 determines a ground truth by prioritizing the most recently disposed of the similar alerts, affording the more recent ones greater influence than older ones. At block 508, label revisor engine 104 determines whether each alert of the similar-alerts data set has been processed. If not, label revisor engine 104 proceeds to block 510. At block 510, label revisor engine 104 computes the age of each alert (e.g., based on a timestamp of each alert) contained in the similar-alerts dataset, and at block 512 assigns each a weight, the weight based on how recently the corresponding alert was generated. In some embodiments, the weights assigned to each alert are computed as an exponentially decreasing function of time. If each alert of the similar-alerts dataset is processed, label revisor engine 104 proceeds to block 514.

At block 514, label revisor engine 104 aggregates the weights of each alert of the similar-alerts dataset. Each alert will correspond to an action recommendation, either to escalate the alert or close out the alert. If the sum of the weights assigned to alerts corresponding to escalate is greater than or equal to the sum of weights assigned to alerts corresponding to closure, then the ground truth of the similar-alerts dataset determined by label revisor engine 104 at block 516 is escalate. Otherwise, the ground truth is closure.

If at block 518, there is a non-discarded alert remaining to examine, label revisor engine 104 proceeds to block 520. At block 520, label revisor engine 104 determines whether the label of an alert corresponds to the computed ground truth and, if not, at block 522 revises the label. In some embodiments, however, label revisor engine 104 only revises an alert's label if the label deviates from the computed ground truth and the label was generated more than a predetermined time earlier (e.g., 90 days earlier). Once each alert of the similar-alerts dataset is examined, label revisor engine 104 branches to block 504 to determine whether all such similar-alerts datasets have been processed.

Once all similar-alerts datasets have been processed—and the labels of certain alerts revised—the events of the similar-alerts datasets are electronically stored in database 116 in block 406. The processes performed on the events by system 100 have revised the global set of events by retaining some, discarding others, and changing corresponding labels of the events as necessary to mitigate or eliminate bias. System 100 conveys the reduced-bias set of events to threat disposition platform 110 for training machine learning model 114. Based on some applications of system 100, the bias reduction rendered by system 100 has improved the accuracy of machine learning prediction models by more than eight percent, improving increasing the 87 percent accuracy of some models to as much as 97 percent.

Over time, as future alerts are generated in real time by threat monitoring tool 106, the future alerts are fed into system 100. Performing the processes described herein, system 100 mitigates or eliminates bias among the future alerts and labels the future alerts for training machine learning model 114. Machine learning model 114, based on the now-labeled future alerts, continues to learn to classify alerts—in a sense being retrained or updated as future alerts, now labeled, are fed into machine learning model 114 and the model uses the now-labeled future alerts as new or additional training examples.

System 100, by processing the future alerts as described herein and thereby mitigating or eliminating bias, enhances the predictive accuracy of machine learning model 114. By the elimination of duplicate alerts performed by ASD/DAE engine 102, duplicate alerts that may have been inconsistently labeled by an analyst's bulk action are discarded and machine learning model 114 receives training examples that are thus likely more accurate (less likely biased). With the elimination of now-outdated alerts (e.g., have an age of greater than 90 days) and relabeling of alerts that deviate from a time-based ground truth determined by label revisor engine 104, any bias in labeled alerts fed into machine learning model 114 is further reduced or mitigated entirely. Thus, with time, the future predictive accuracy of machine learning model 114 is likely to increase. Moreover, as already noted, the elimination of duplicate alerts enhances the efficiency of the computer hardware used to implement threat disposition platform 110 by reducing the number of alerts processed by one or more processors and stored in memory of the computer.

FIG. 6 illustrates a schematic of an example of a computing node 600. In one or more embodiments, computing node 600 is an example of a suitable cloud computing node. Computing node 600 is not intended to suggest any limitation as to the scope of use or functionality of embodiments of the invention described herein. Computing node 600 is capable of performing any of the functionality described within this disclosure.

Computing node 600 includes a computer system 612, which is operational with numerous other general-purpose or special-purpose computing system environments or configurations. Examples of well-known computing systems, environments, and/or configurations that may be suitable for use with computer system 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 612 may be described in the general context of computer system-executable instructions, such as program modules, being executed by a computer system. Generally, program modules may include routines, programs, objects, components, logic, data structures, and so on that perform particular tasks or implement particular abstract data types. Computer system 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system 612 is shown in the form of a general-purpose computing device. The components of computer system 612 may include, but are not limited to, one or more processors 616, a memory 628, and a bus 618 that couples various system components including memory 628 to processor 616. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 618 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 612 typically includes a variety of computer system-readable media. Such media may be any available media that is accessible by computer system 612, and may include both volatile and non-volatile media, removable and non-removable media.

Memory 628 may include computer system readable media in the form of volatile memory, such as random-access memory (RAM) 630 and/or cache memory 632. Computer system 612 may further include other removable/non-removable, volatile/non-volatile computer system storage media. By way of example, storage system 634 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. For example, one or more of the program modules may include a system for mitigating bias in a machine learning-augmented threat disposition platform, such as system 100, or portions thereof.

Program/utility 640 is executable by processor 616. Program/utility 640 and any data items used, generated, and/or operated upon by computer system 612 are functional data structures that impart functionality when employed by computer system 612. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 612 may also communicate with one or more external devices 614 such as a keyboard, a pointing device, a display 624, etc.; one or more devices that enable a user to interact with computer system 612; and/or any devices (e.g., network card, modem, etc.) that enable computer system 612 to communicate with one or more other computing devices. Such communication can occur via input/output (I/O) interfaces 622. Still, computer system 612 can communicate with one or more networks such as a local area network (LAN), a general wide area network (WAN), and/or a public network (e.g., the Internet) via network adapter 620. As depicted, network adapter 620 communicates with the other components of computer system 612 via bus 618. It should be understood that although not shown, other hardware and/or software components could be used in conjunction with computer system 612. Examples, include, but are not limited to: microcode, device drivers, redundant processing units, external disk drive arrays, RAID systems, tape drives, and data archival storage systems, etc.

While computing node 600 is used to illustrate an example of a cloud computing node, it should be appreciated that a computer system using an architecture the same as or similar to that described in connection with FIG. 6 may be used in a non-cloud computing implementation to perform the various operations described herein. In this regard, the example embodiments described herein are not intended to be limited to a cloud computing environment. Computing node 600 is an example of a data processing system. As defined herein, "data processing system" means one or more hardware systems configured to process data, each hardware system including at least one processor programmed to initiate operations and memory.

Computing node 600 is an example of computer hardware. Computing node 600 may include fewer components than shown or additional components not illustrated in FIG. 6 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 600 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
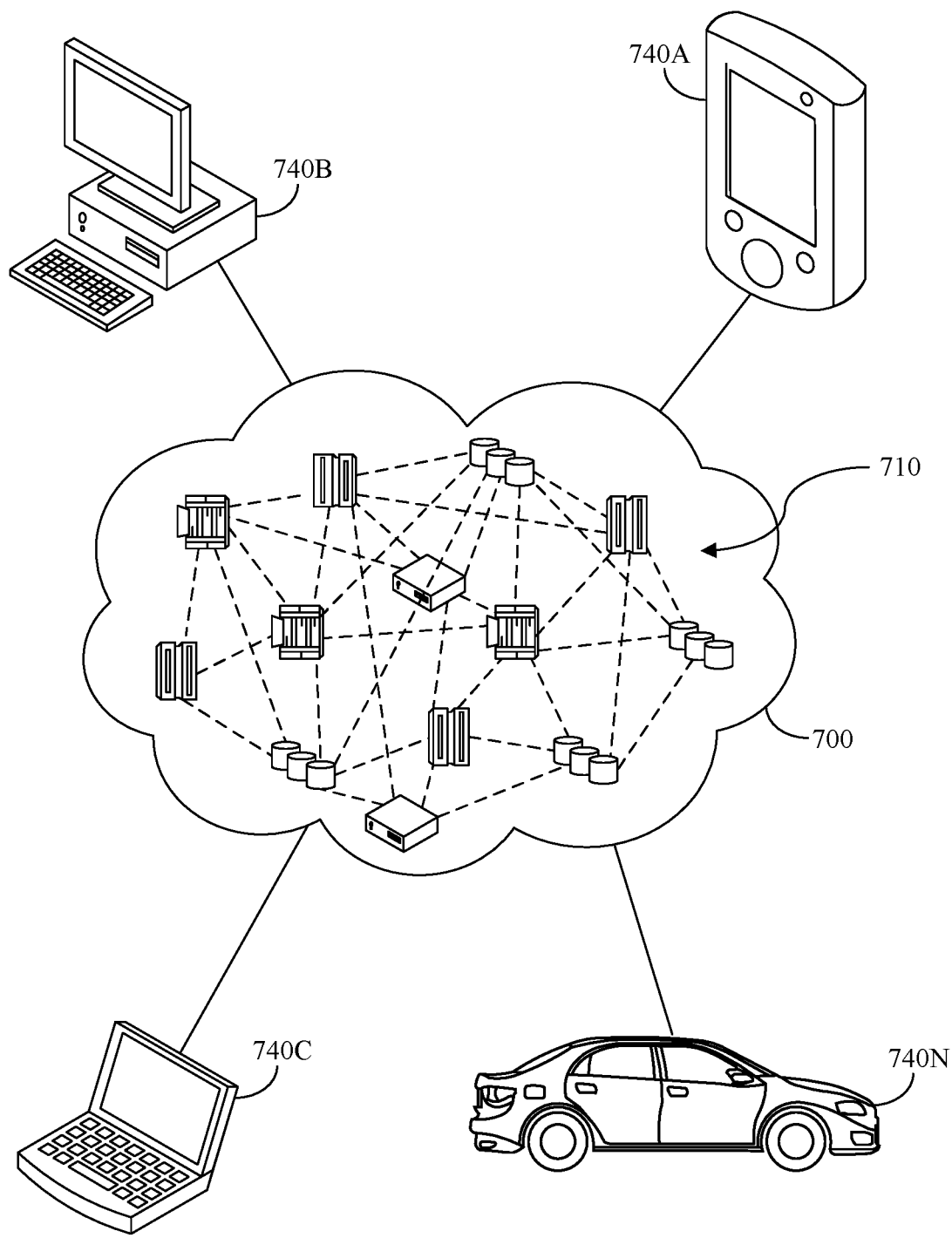
FIG. 7 illustrates a cloud computing environment.

Referring now to FIG. 7, illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 740*a*, desktop computer 740*b*, laptop computer 740*c*, and/or automobile computer system 740*n* may communicate. Computing nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 740*a-n* shown in FIG. 7 are intended to be illustrative only and that computing nodes 710 and cloud computing environment 700 can communicate with any type of computerized device over any type of network and/or network addressable connection (e.g., using a web browser).

Figure 8:
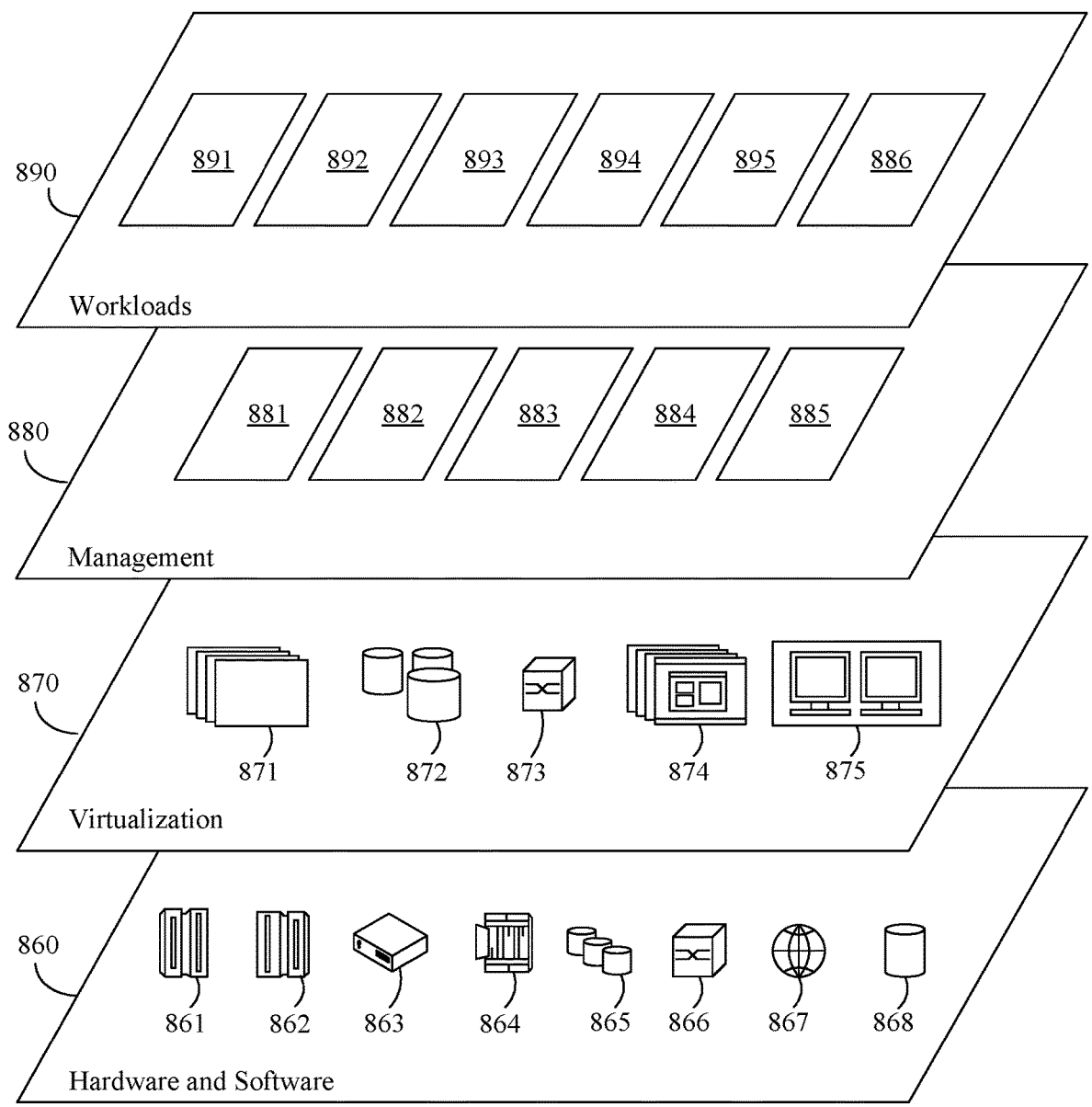
FIG. 8 illustrates example abstraction model layers of the cloud computing environment of FIG. 7.

Referring now to FIG. 8, a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes 861; RISC (Reduced Instruction Set Computer) architecture-based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and a system for mitigating bias in a machine learning-augmented threat disposition platform 896.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process. Accordingly, a "real-time" event or object is one rendered in real time.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" and "analyst" each refer to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of mitigating bias in a machine learning-augmented threat disposition platform, the computer-implemented method comprising:
   generating a group of alerts in response to determining a similarity among the alerts, wherein the alerts are generated in real time by a threat monitoring tool in response to one or more potential threats to a networked computing system;
   determining one or more alert spikes by partitioning the group into one or more alert spike subgroups, wherein each alert spike subgroup, of the one or more alert spike subgroups, corresponds to an alert spike and contains two or more similar alerts that were generated within a predetermined time interval of one another;
   discarding duplicate alerts in each alert spike subgroup and labeling each non-discarded alert;
   training a machine learning model using each non-discarded alert as a labeled training example;
   relabeling an alert of the non-discarded alerts based at least in part on an age of the alert exceeding a predetermined threshold; and
   retraining the machine learning model based at least in part on the relabeled alert, wherein the retraining decreases bias in the machine learning model and increases predictive accuracy of the machine learning model.

2. The method of claim 1, comprising:
   responsive to determining, in real time, a similarity between a first newly generated alert and a second newly generated alert generated within a predetermined time interval of generation of the first newly generated alert, creating an incipient alert spike subgroup containing the first newly generated alert and the second newly generated alert.

3. The method of claim 1, comprising:
   closing one of the one or more alert spike subgroups in response to determining that a predetermined time interval has lapsed without adding a newly generated alert to the one of the one or more alert spike subgroups, wherein the closing removes the one of the one or more alert spikes from a list of active alert spike subgroups and discards all but one of the alerts contained in the one or more alert spike subgroups.

4. The method of claim 1, comprising:
   generating a similar-alerts dataset and assigning weights to each alert contained the similar-alerts dataset, wherein each of the weights corresponds to a time of generation of each alert contained the similar-alerts dataset; and
   labeling each alert contained in the similar-alerts dataset according to a ground truth determined based on summing the weights, wherein each label comprises one of escalate or closure.

5. The method of claim 4, wherein
   changing a current label of one of the alerts contained in the similar-alerts dataset is precluded unless an age of the one of the alerts contained in the similar-alerts dataset is greater than a predetermined threshold.

6. The method of claim 4, wherein
   the assigning weights assigns to each one of the alerts contained in the similar-alerts dataset a weight computed as an exponentially decreasing function of time.

7. A system, comprising:
   one or more processors; and
   one or more memory devices coupled to the one or more processors, wherein the one or more processors are configured to:
   generate a group of alerts in response to determining a similarity among the alerts, wherein the alerts are generated in real time by a threat monitoring tool in response to one or more potential threats to a networked computing system;
   determine one or more alert spikes by partitioning the group into one or more alert spike subgroups, wherein each alert spike subgroup, of the one or more alert spike groups, corresponds to an alert spike, of the one or more alert spikes, and contains two or more similar alerts that were generated within a predetermined time interval of one another;
   discard duplicate alerts in each alert spike, of the one or more alert spikes, and label each non-discarded alert;
   train a machine learning model using each non-discarded alert as a labeled training example;
   relabel an alert of the non-discarded alerts based at least in part on an age of the alert exceeding a predetermined threshold; and
   retrain the machine learning model based at least in part on the relabeled alert, wherein the retraining decreases bias in the machine learning model and increases predictive accuracy of the machine learning model.

8. The system of claim 7, wherein the one or more processors are further configured to:
   create an incipient alert spike subgroup containing a first newly generated alert and a second newly generated alert responsive to determining, in real time, a similarity between the first newly generated alert and the second newly generated alert generated within a predetermined time interval of generation of the first newly generated alert.

9. The system of claim 7, wherein the one or more processors are further configured to:
   close one of the one or more alert spike subgroups in response to determining that a predetermined time interval has lapsed without adding a newly generated alert to the one of the one or more alert spike subgroups, wherein the closing removes the one of the one or more alert spikes from a list of active alert spike subgroups and discards all but one of the alerts contained in the one or more alert spike subgroups.

10. The system of claim 7, wherein the one or more processors are further configured to:
    generate a similar-alerts dataset and assigning weights to each alert contained in the similar-alerts dataset, wherein each of the weights corresponds to a time of generation of each alert contained in the similar-alerts dataset; and
    label each alert contained in the similar-alerts dataset according to a ground truth determined based on summing the weights, wherein each label comprises one of escalate or closure.

11. The system of claim 10, wherein changing a current label of one of the alerts contained in the similar-alerts dataset is precluded unless an age of the one of the alerts contained in the similar-alerts dataset is greater than a predetermined threshold.

12. A non-transitory computer-readable medium storing a set of instructions for wireless communication, the set of instructions comprising:
one or more instructions that, when executed by one or more processors of a device, cause the device to:
generate a group of alerts in response to determining a similarity
among the alerts, wherein the alerts are generated in real time by a threat monitoring tool in response to one or more potential threats to a networked computing system;
determine one or more alert spikes by partitioning the group into one or more alert spike subgroups, wherein each alert spike subgroup, of the one or more alert spike subgroups, corresponds to an alert spike and contains two or more similar alerts that were generated within a predetermined time interval of one another;
discard duplicate alerts in each alert spike, of the one or more alert spikes, and label each non-discarded alert;
train a machine learning model using each non-discarded alert as a labeled training example;
relabel an alert of the non-discarded alerts based at least in part on an age of the alert exceeding a predetermined threshold; and
retrain the machine learning model based at least in part on the relabeled alert, wherein the retraining decreases bias in the machine learning model and increases predictive accuracy of the machine learning model.

13. The non-transitory computer-readable medium of claim 12, wherein the one or more instructions cause the device to:
create an incipient alert spike subgroup containing a first newly generated alert and a second newly generated alert responsive to determining, in real time, a similarity between the first newly generated alert and the second newly generated alert generated within a predetermined time interval of generation of the first newly generated alert.

14. The non-transitory computer-readable medium of claim 12, wherein the one or more instructions cause the device to:
close one of the one or more alert spike subgroups in response to determining that a predetermined time interval has lapsed without adding a newly generated alert to the one of the one or more alert spike subgroups, wherein the closing removes the one of the one or more alert spikes from a list of active alert spike subgroups and discards all but one of the alerts contained in the one or more alert spike subgroups.

15. The non-transitory computer-readable medium of claim 12, wherein the one or more instructions cause the device to:
generate a similar-alerts dataset and assigning weights to each alert contained in the similar-alerts dataset, wherein each of the weights corresponds to a time of generation of each alert contained in the similar-alerts dataset; and
label each alert contained in the similar-alerts dataset according to a ground truth determined based on summing the weights, wherein each label comprises one of escalate or closure.

16. The non-transitory computer-readable medium of claim 15, wherein changing a current label of one of the alerts contained in the similar-alerts dataset is precluded unless an age of the one of the alerts contained in the similar-alerts dataset is greater than a predetermined threshold.

17. The non-transitory computer-readable medium of claim 15, wherein the one or more instruction, to assign weights, cause the device to assign to each one of the alerts contained in the similar-alerts dataset a weight computed as an exponentially decreasing function of time.

18. The method of claim 1, further comprising:
generating a hash signature corresponding to a vector representation of each of the non-discarded alerts.

19. The system of claim 7, wherein the one or more processors are further configured to:
generate a hash signature corresponding to a vector representation of each of the non-discarded alerts.

20. The non-transitory computer-readable medium of claim 12, wherein the one or more instructions cause the device to:
generate a hash signature corresponding to a vector representation of each of the non-discarded alerts.

* * * * *